US010970966B2

(12) United States Patent
Burillo et al.

(10) Patent No.: US 10,970,966 B2
(45) Date of Patent: Apr. 6, 2021

(54) SPONTANEOUS ECO-SYSTEM OF AFTERMARKET BROKERED WAGERS

(71) Applicant: Hedgekings LLC, Key Biscayne, FL (US)

(72) Inventors: Eduardo Burillo, Key Biscayne, FL (US); Jeffrey Gross, Key Biscayne, FL (US)

(73) Assignee: HEDGEKINGS LLC, Key Biscayne, FL (US)

( * ) Notice: Subject to any disclaimer, the term of this patent is extended or adjusted under 35 U.S.C. 154(b) by 0 days.

(21) Appl. No.: 16/428,437

(22) Filed: May 31, 2019

(65) Prior Publication Data

US 2020/0380822 A1 Dec. 3, 2020

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G07F 17/32*** | (2006.01) |

(52) U.S. Cl.
CPC ...... *G07F 17/3244* (2013.01); *G07F 17/3223* (2013.01)

(58) Field of Classification Search
USPC .............................. 463/1, 20, 22, 25, 39, 40
See application file for complete search history.

(56) References Cited

U.S. PATENT DOCUMENTS

| | | | | |
|---|---|---|---|---|
| 2005/0171878 A1* | 8/2005 | Pennock | ................ | G06Q 40/00 705/35 |
| 2009/0023493 A1 | 1/2009 | Cheng et al. | | |
| 2009/0313144 A1 | 12/2009 | Kadikar | | |
| 2014/0274291 A1* | 9/2014 | Elias | ........................ | G07F 17/34 463/20 |
| 2015/0228160 A1 | 8/2015 | Georgiopoulos et al. | | |
| 2017/0221308 A1 | 8/2017 | Lakhotia | | |

* cited by examiner

*Primary Examiner* — Adetokunbo O Torimiro
(74) *Attorney, Agent, or Firm* — Steven M. Greenberg, Esq.; Shutts & Bowen LLP

(57) ABSTRACT

In a spontaneous eco-system of aftermarket brokered wagers different subscribers are registered to an aftermarket wager brokering computing system and a request received from one of the subscribers to import a wager pool of new wagers none of which are published in the aftermarket wager brokering system. For each of the new wagers, odds are then extracted from the request, and also an amount wagered, and yet further a list of participants owning the new wagers, none of whom are subscribed to the aftermarket wager brokering system other than the one of the subscribers from which the request is received. Finally, the extracted information is written to a registry, the new wagers published for aftermarket re-sale and an entry written to the registry responsive to an acquisition of a portion of one of the new wagers so as to indicate a fractional ownership of the one of the new wagers.

15 Claims, 2 Drawing Sheets

SPONTANEOUS ECO-SYSTEM OF AFTERMARKET BROKERED WAGERS

BACKGROUND OF THE INVENTION

Field of the Invention

The present invention relates to the field online wagering and bet brokering and more particularly to secondary markets for trading online wagers.

Description of the Related Art

Online wagering, also known as online gambling, has existed in several forms for several decades. Generally speaking, online wagering refers to the placement of wagers or bets through a computer interface by way of a remote automated process over a computer communications network such as the global Internet. Online wagering supports many different types of gambling activities including games of chance—particularly card and dice games, online virtual slot machines, pari-mutuel contests and sports wagering. In connection with sports wagering, individual gamblers may directly place bets with a centralized sports book, or the individual gamblers may indirectly place bets through a clearing house in which bets are brokered—so called bet brokering operations.

In general, in the context of sports gambling, a wager is placed in consideration of a cash payment and in connection with a prediction of a specific contingency—an occurrence of an event such as a particular individual or team winning or losing a particular competition, a particular score resulting from a particular competition, or a number or frequency of actions or outcomes that occur during the course of a particular competition. Indeed, sports gambling is not limited to sporting events as wagers likewise can be place on nearly any contest such as a political contest, or an artistic performance. Irrespective of the nature of the contingency of a wager, in most instances, the wager is purchased by the bettor providing funds to the facilitator of the bet, in consequence of which the bettor receives a document, electronic or physical, that specifies the contingency of the wager and the odds associated with the wager.

Of course, to the extent that the wager is placed through a middleman, a small portion of the wager is reserved as a commission for the middleman. Importantly, as it is widely understood, the odds associated with a wager once placed, may change depending upon external circumstances which may influence the probability of the outcome of the wager. As well, the odds associated with a wager may fluctuate depending upon the volume and nature of other wagers placed upon the same criteria by other betters indicating a crowd-sourced mentality of the probability of the associated contingency occurring.

Notably, for a single wager, for most bettors, once the wager has been purchased, no changes are required and the bettor may simply await the outcome to learn of the better has lost the wager, or if the better has won the wager. But, for some wagers, the comfort level of holding particular wagers can vary. To wit, in some instances, a bettor may feel overextended with too many wagers in play, whereas in other instances, the better may lose confidence in a particular wager where the odds have changed for the particular wager since the acquisition of the wager. However, once the wager has been placed, little can be done aside from seeking private secondary market transactions of the complete wager aimed at the sale of the entire wager to a purchaser willing to pay either a premium or a discounted rate for an existing wager depending upon the differential between the odds at the time of acquisition of the wager and the time of re-sale.

BRIEF SUMMARY OF THE INVENTION

Embodiments of the present invention address deficiencies of the art in respect to the aftermarket brokering of wagers and provide a novel and non-obvious method, system and computer program product for generating and managing a spontaneous eco-system of aftermarket brokered wagers. In a method of the invention, a multiplicity of different subscribers registers in an aftermarket wager brokering computing system that brokers a multiplicity of published wagers owned fully by owing ones of the different subscribers each for the purpose of facilitating a fractional purchase by others of the different subscribers. Thereafter, a request is received from one of the subscribers to import a wager pool of new wagers based upon a stated outcome of an event yet to occur wherein none of the new wagers are published in the aftermarket wager brokering computing system.

For each of the new wagers, odds are then extracted from the request, as is an amount wagered for each of the new wagers. As well, a list of participants owning the new wagers in the pool are extracted from the request, wherein none of the participants in the list are subscribed to the aftermarket wager brokering system other than the one of the subscribers from which the request is received. Finally, the extracted information is written to a registry of the aftermarket wager brokering computing system, the new wagers are published for aftermarket re-sale by the aftermarket wager brokering computing system and an entry is written to the registry responsive to an acquisition of a portion of one of the new wagers by a purchasing one of the different subscribers indicating a fractional ownership of the one of the wagers.

In one aspect of the embodiment, an electronic payment is initiated from the purchasing one of the different subscribers to the one of the subscribers from which the request is received in consideration for the acquisition of the portion of the one of the new wagers. As such, the method additionally includes receiving funds in respect to a payout determined for the one of the new wagers, computing a portion of the received funds allocable to a corresponding one of the participants owning the one of the new wagers who is not subscribed to the aftermarket brokered wager computing system, and also a portion of the received funds allocable to the purchasing one of the different subscribers proportional to the portion of the one of the new wagers and initiating two electronic payments from the received funds, a first of the electronic payments to the one of the subscribers from which the request is received in consideration for the acquisition of the portion of the one of the new wagers, and a second of the electronic payments to the purchasing one of the different subscribers.

In another aspect of the embodiment, a brokerage fee is deducted from the received funds before initiating the two electronic payments from the received funds. In yet another aspect of the embodiment, each of the participants owning the one of the new wagers who is not subscribed to the aftermarket brokered wager computing system is messaged with a hyperlink to a Web page at which each of the participants may become registered as subscribers to the aftermarket wagers brokering computing system.

In another embodiment of the invention, a data processing system is configured for creating a spontaneous eco-system of aftermarket brokered wagers. The system includes a host computing system that has one or more computers, each with memory and at least one processor. The system further includes a data storage device storing a database of subscribers and wagers. The system yet further includes an aftermarket brokered wager computing system adapted to receive registration requests by different ones of the subscribers buying and selling wagers to one another and to respond to the requests by writing to the database records indicating ownership of the different wagers. Finally, the system includes a spontaneous eco-system of wagers creation engine.

The engine includes computer program instructions executing in the memory of the host computing system. The instructions are enabled to receive a request from one of the subscribers to import a wager pool of new wagers based upon a stated outcome of an event yet to occur wherein none of the new wagers are published in the aftermarket brokered wager computing system. The instructions also are enabled to extract from the request, odds for each of the new wagers and an amount wagered for each of the new wagers, and a list of participants owning the new wagers, none of whom are subscribed to the aftermarket wager brokering system other than the one of the subscribers from which the request is received. The instructions yet further are enabled to write to a registry of the aftermarket brokered wager computing system, the extracted information and to publish the new wagers in the pool for aftermarket re-sale by the aftermarket wager brokering computing system. Finally, the instructions are enabled to write an entry to the registry responsive to an acquisition of a portion of one of the new wagers by a purchasing one of the different subscribers indicating a fractional ownership of the one of the wagers.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for the creation of a spontaneous eco-system of aftermarket brokered wagers. In accordance with an embodiment of the invention, different subscribers subscribe to an aftermarket brokered wagering system. Different wagers held by ones of the subscribers are then registered with the system. Thereafter, one of the subscribers transmits to the system a request to import a wager pool of new wagers based upon a stated outcome of an event yet to occur in so far as none of the new wagers are published in the aftermarket wager brokering computing system. From the request, odds may be extracted for each of the new wagers along with an amount wagered. As well, a list may be extracted from the request of participants owning the new wagers in the pool, none of whom are subscribed to the aftermarket wager brokering system other than the one of the subscribers from which the request is received. Even further, for each of the wagers, contemporaneous odds may be retrieved from a third party publisher of odds. The extracted information and, optionally, the contemporaneous odds, are then written to a registry of the aftermarket wager brokering computing system and the new wagers in the pool may be published for aftermarket re-sale by the aftermarket wager brokering computing system. Finally, an entry to the registry is written in response to an acquisition of a portion of one of the new wagers by a purchasing one of the different subscribers indicating a fractional ownership of the one of the wagers.

Figure 1:
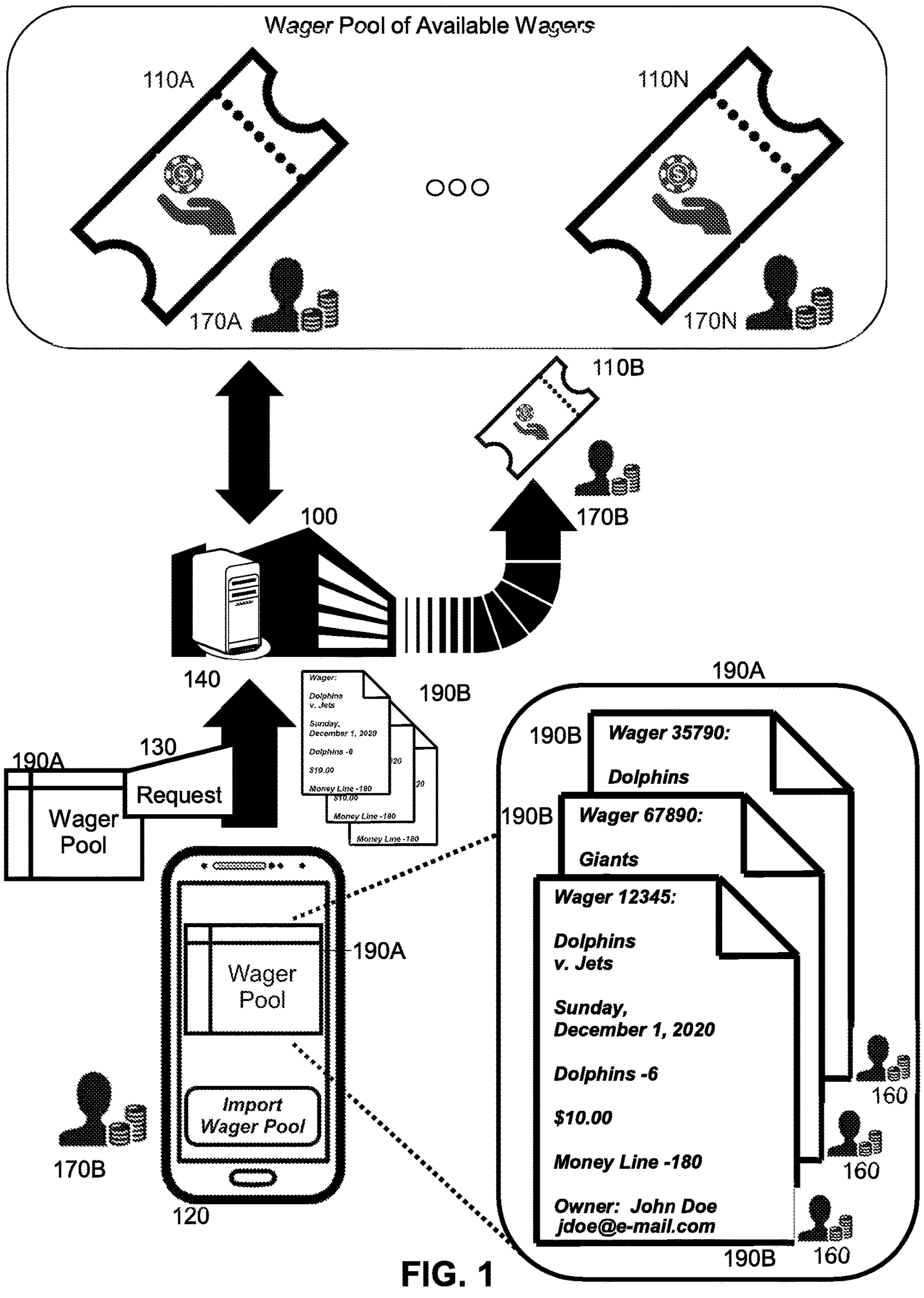
FIG. 1 is a pictorial illustration of a process for creating a spontaneous eco-system of aftermarket brokered wagers.

In further illustration, FIG. 1 pictorially shows a process for creating a spontaneous eco-system of aftermarket brokered wagers. As shown in FIG. 1, different subscribers 170A, 170B, 170N to an aftermarket wager brokering system 140 of an aftermarket wager broker 100 respectively publish different wagers 110A, 110N for fractional aftermarket resale in the aftermarket wager brokering system 140. In this regard, each of the wagers 110A, 110N may be resold by individual ones of the subscribers 170A, 170B, 170N, in respect to only a fractional portion thereof, to others of the subscribers 170A, 170B, 170N so that fractionally resold ones of the wagers 110A, 110N have two or more owning ones of the subscribers 170A, 170B, 170N, each owning only a portion of a corresponding complete one of the wagers 110A, 110N.

In the present invention, however, participation in the aftermarket brokering of the wagers 110A, 110N for fractional purchase is not limited only to the subscribers 170A, 170B, 170N. Rather, in accordance with the present invention, a spontaneous eco-system of newly presented wagers 190B in a pool 190A by different non-subscribers 160 may be introduced into the aftermarket wager brokering system 140. More particularly, the pool 190A can be packaged as a digital table of individual ones of the newly presented wagers 190B each specifying a wager identifier, a textual indication of an event yet to occur and a stated outcome, along with any relevant odds and an identity of a corresponding owning one of the non-subscribers 160 including an e-mail address of the corresponding owning one of the non-subscribers 160. A particular one of the subscribers 170B then transmits a request 130 encapsulating the pool 190A to the aftermarket wager brokering system 140 over a computer communications network through a user interface to the aftermarket wager brokering system 140 presented in a mobile computing device of the particular one of the subscribers 170B.

Once the request 130 with the pool 190A has been received in the aftermarket wager brokering system 140, the aftermarket wager brokering system 140 extracts from the request 130, the newly presented wagers 190B including for each of the wagers 190B, the wager identifier, the textual indication of an event yet to occur and the stated outcome, along with any relevant odds and the identity of a corresponding owning one of the non-subscribers 160 including the e-mail address of the corresponding owning one of the non-subscribers 160. The aftermarket wager brokering system 140 then creates for each of the wagers 190B in the pool 190A, a corresponding publication of a new wager 110B in association with the particular one of the subscribers 170B—not the owning one of the non-subscribers 160.

Subsequently, to the extent that a purchasing one of the subscribers 170A, 170N purchases a fractional interest in the new wager 110B, the aftermarket wager brokering system 140 coordinates the payment of the net funds provided by purchasing one of the subscribers 170A, 170N less any administrative fees, to the particular one of the subscribers. As well, to the extent that a payout occurs in consequence of the new wager 110B, the aftermarket wager brokering system 140 transfers to the particular one of the subscribers 170B the proportion of the payout owing to the owning one of the non-subscribers 160 in respect to the new wager 110B. Finally, the aftermarket wager brokering system 140 transmits to the e-mail address of the owning one of the non-subscribers 160, a uniform resource locator (URL) of a Web site at which the owning one of the non-subscribers 160 may register with the aftermarket wager brokering system 140 as a subscriber.

Figure 2:
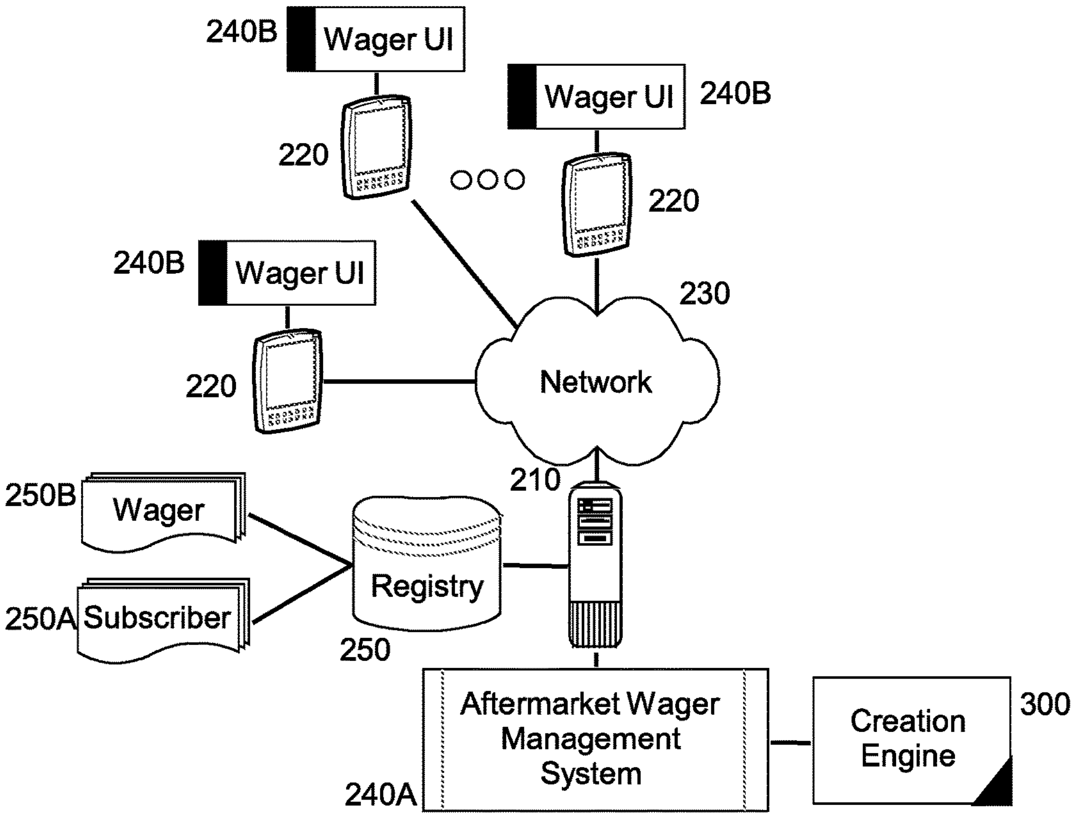
FIG. 2 is a schematic illustration of a data processing system configured to create a spontaneous eco-system of aftermarket brokered wagers; and, FIG. 3 is a flow chart illustrating a process for creating a spontaneous eco-system of aftermarket brokered wagers.

The process described in connection with FIG. 1 may be implemented in a computer data processing system. In further illustration, FIG. 2 schematically shows a data processing system configured to create a spontaneous eco-system of aftermarket brokered wagers. The system includes a host computing platform 210 that includes one or more computers, each with memory and at least one processor. The host computing platform 210 supports the operation of an aftermarket wager brokering system 240A coupled to a registry 250 of existing wager records 250B reflecting wagers held by different registered subscribers 250A. The aftermarket wager brokering system 240A permits the subscribers 250A to re-sell ones of the wagers reflected by a corresponding one of the wager records 250B to one another from over a computer communications network 230 through respectively different mobile computing devices 220 each sporting a user interface 240B to the aftermarket wager brokering system 240A.

Notably, a spontaneous wager eco-system creation engine 300 is coupled to the aftermarket wager brokering system 240A. The creation engine 300 includes computer program instructions that when executing in the memory of the host computing platform 210, are enabled to receive from one of the computing devices 220 of a particular one of the subscribers 250A, a request to import a pool of wagers owned by respectively different non-subscribers to the aftermarket wager brokering system 240A. The program instructions are further enabled to extract from the request, for each of the wagers in the pool, a wager identifier, a textual indication of an event yet to occur and a stated outcome, relevant odds and an identity of a corresponding owning one of the non-subscribers including the e-mail address of the corresponding owning one of the non-subscribers. The program instructions yet further are enabled to create in the registry 250 for each one of the new wagers in the pool, a new one of the wager records 250B indicating for each of the new wagers as a corresponding owner, the particular one of the subscribers 250A as opposed to an owning one of the non-subscribers.

Figure 3:
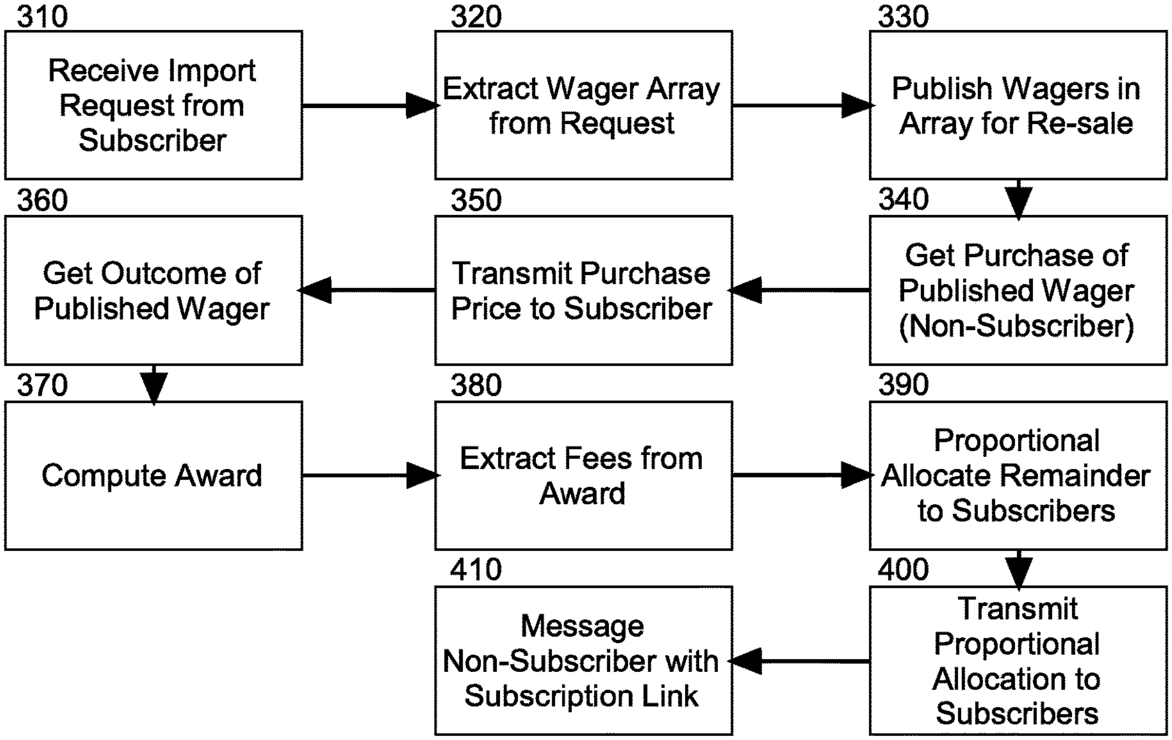

In even yet further illustration of the operation of the creation engine 300, FIG. 3 is a flow chart illustrating a process for creating a spontaneous eco-system of aftermarket brokered wagers. Beginning in block 310, an import request is received from a publishing subscriber to the aftermarket wager brokering system. In block 320, a data structure is extracted from the request that encapsulates a list of one or more wagers each owned by a corresponding non-subscriber to the aftermarket wager brokering system. In block 330, for each of the wagers in the list, a corresponding new wager is published in the aftermarket wager brokering system for fractional re-sale to one or more of the subscribers to the aftermarket wager brokering system. Optionally, an administrative fee may be assessed for each of the wagers to the publishing subscriber at that time.

In block 340, one of the new wagers is fractionally purchased by a purchasing subscriber in the aftermarket wager brokering system such that the purchasing subscriber owns a fractional portion of the one of the new wagers. Thereafter, in block 350, the purchase price paid by the purchasing subscriber, less any administrative fees, is electronically transmitted to the publishing subscriber as opposed to the non-subscriber actually owning the one of the new wagers. Subsequently, in block 360 an outcome is determined for the new one of the wagers and in block 370, a resultant award is computed for the outcome. In block 380, administrative fees are extracted from the computed resultant award and in block 390, the net reward is proportionally allocated to the publishing subscriber and the purchasing subscribing according to the fractional ownership of each. Then, in block 400, the appropriate proportional allocations of the net reward are transmitted to the purchasing and publishing subscribers. Finally, in block 410, an electronic message such as an e-mail is transmitted to the non-subscriber with an embedded link to a Web page at which the non-subscriber can register with the aftermarket wager brokering system as a new subscriber.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms “a”, “an” and “the” are intended to include the plural forms as well, unless the context clearly indicates otherwise. It will be further understood that the terms “includes” and/or “including,” when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A wager management method for a spontaneous eco-system of wagers, the method comprising:

registering a multiplicity of different subscribers to an aftermarket wager brokering computing system brokering a multiplicity of published wagers owned fully by owing ones of the different subscribers for fractional purchase by others of the different subscribers;

receiving a request from one of the subscribers to import a wager pool of new wagers based upon a stated outcome of an event yet to occur wherein none of the new wagers are published in the aftermarket wager brokering computing system;

extracting from the request, odds for each of the new wagers and an amount wagered for each of the new wagers, and a list of participants owning the new wagers in the pool, none of whom are subscribed to the aftermarket wager brokering system other than the one of the subscribers from which the request is received;

writing to a registry of the aftermarket wager brokering computing system, the extracted information;

publishing the new wagers in the pool for aftermarket re-sale by the aftermarket wager brokering computing system; and, writing an entry to the registry responsive to an acquisition of a portion of one of the new wagers by a purchasing one of the different subscribers indicating a fractional ownership of the one of the wagers.

2. The method of claim 1, further comprising:

initiating an electronic payment from the purchasing one of the different subscribers to the one of the subscribers from which the request is received in consideration for the acquisition of the portion of the one of the new wagers.

3. The method of claim 2, further comprising:

receiving funds in respect to a payout determined for the one of the new wagers;

computing a portion of the received funds allocable to a corresponding one of the participants owning the one of the new wagers who is not subscribed to the aftermarket brokered wager computing system, and also a portion of the received funds allocable to the purchasing one of the different subscribers proportional to the portion of the one of the new wagers; and, initiating two electronic payments from the received funds, a first of the electronic payments to the one of the subscribers from which the request is received in consideration for the acquisition of the portion of the one of the new wagers, and a second of the electronic payments to the purchasing one of the different subscribers.

4. The method of claim 3, further comprising:

deducting a brokerage fee from the received funds before initiating the two electronic payments from the received funds.

5. The method of claim 1, further comprising:

messaging each of the participants owning the one of the new wagers who is not subscribed to the aftermarket brokered wager computing system with a hyperlink to a Web page at which each of the participants may become registered as subscribers to the aftermarket wagers brokering computing system.

6. A data processing system configured for creating a spontaneous eco-system of aftermarket brokered wagers, the system comprising:

a host computing system comprising one or more computers, each with memory and at least one processor;

a data storage device storing a database of subscribers and wagers;

an aftermarket brokered wager computing system adapted to receive registration requests by different ones of the subscribers buying and selling wagers to one another and to respond to the requests by writing to the database records indicating ownership of the different wagers; and, a spontaneous eco-system of wagers creation engine comprising computer program instructions executing in the memory of the host computing system and enabled to perform:

receiving a request from one of the subscribers to import a wager pool of new wagers based upon a stated outcome of an event yet to occur wherein none of the new wagers are published in the aftermarket brokered wager computing system;

extracting from the request, odds for each of the new wagers and an amount wagered for each of the new wagers, and a list of participants owning the new wagers in the pool, none of whom are subscribed to the aftermarket wager brokering system other than the one of the subscribers from which the request is received;

writing to a registry of the aftermarket brokered wager computing system, the extracted information;

publishing the new wagers in the pool for aftermarket re-sale by the aftermarket wager brokering computing system; and, writing an entry to the registry responsive to an acquisition of a portion of one of the new wagers by a purchasing one of the different subscribers indicating a fractional ownership of the one of the wagers.

7. The system of claim 6, wherein the program instructions are further enabled to perform:

initiating an electronic payment from the purchasing one of the different subscribers to the one of the subscribers from which the request is received in consideration for the acquisition of the portion of the one of the new wagers.

8. The system of claim 7, wherein the program instructions are further enabled to perform:

receiving funds in respect to a payout determined for the one of the new wagers;

computing a portion of the received funds allocable to a corresponding one of the participants owning the one of the new wagers who is not subscribed to the aftermarket brokered wager computing system, and also a portion of the received funds allocable to the purchasing one of the different subscribers proportional to the portion of the one of the new wagers; and, initiating two electronic payments from the received funds, a first of the electronic payments to the one of the subscribers from which the request is received in consideration for the acquisition of the portion of the one of the new wagers, and a second of the electronic payments to the purchasing one of the different subscribers.

9. The system of claim 8, wherein the program instructions are further enabled to perform:

deducting a brokerage fee from the received funds before initiating the two electronic payments from the received funds.

10. The system of claim 6, wherein the program instructions are further enabled to perform:

messaging each of the participants owning the one of the new wagers who is not subscribed to the aftermarket brokered wager computing system with a hyperlink to a Web page at which each of the participants may become registered as subscribers to the aftermarket wagers brokering computing system.

11. A computer program product for wager management for a spontaneous eco-system of wagers, the computer program product including a non-transitory computer readable storage medium having program instructions embodied therewith, the program instructions executable by a device to cause the device to perform a method including:

registering a multiplicity of different subscribers to an aftermarket wager brokering computing system brokering a multiplicity of published wagers owned fully by owing ones of the different subscribers for fractional purchase by others of the different subscribers;

receiving a request from one of the subscribers to import a wager pool of new wagers based upon a stated outcome of an event yet to occur wherein none of the new wagers are published in the aftermarket wager brokering computing system;

extracting from the request, odds for each of the new wagers and an amount wagered for each of the new wagers, and a list of participants owning the new wagers in the pool, none of whom are subscribed to the aftermarket wager brokering system other than the one of the subscribers from which the request is received;

writing to a registry of the aftermarket wager brokering computing system, the extracted information;

publishing the new wagers in the pool for aftermarket re-sale by the aftermarket wager brokering computing system; and, writing an entry to the registry responsive to an acquisition of a portion of one of the new wagers by a purchasing one of the different subscribers indicating a fractional ownership of the one of the wagers.

12. The computer program product of claim 11, wherein the method further comprises:

initiating an electronic payment from the purchasing one of the different subscribers to the one of the subscribers from which the request is received in consideration for the acquisition of the portion of the one of the new wagers.

13. The computer program product of claim 12, wherein the method further comprises:

receiving funds in respect to a payout determined for the one of the new wagers;

computing a portion of the received funds allocable to a corresponding one of the participants owning the one of the new wagers who is not subscribed to the aftermarket brokered wager computing system, and also a portion of the received funds allocable to the purchasing one of the different subscribers proportional to the portion of the one of the new wagers; and, initiating two electronic payments from the received funds, a first of the electronic payments to the one of the subscribers from which the request is received in consideration for the acquisition of the portion of the one of the new wagers, and a second of the electronic payments to the purchasing one of the different subscribers.

14. The computer program product of claim 13, wherein the method further comprises:

deducting a brokerage fee from the received funds before initiating the two electronic payments from the received funds.

15. The computer program product of claim 11, wherein the method further comprises:

messaging each of the participants owning the one of the new wagers who is not subscribed to the aftermarket brokered wager computing system with a hyperlink to a Web page at which each of the participants may become registered as subscribers to the aftermarket wagers brokering computing system.

* * * * *